United States Patent [19]

Bereiter

[11] Patent Number: 4,671,892
[45] Date of Patent: Jun. 9, 1987

[54] PROCESS AND APPARATUS FOR SAPONIFICATION REACTIONS, AND THE LIKE

[75] Inventor: Bruce A. Bereiter, Corona, Calif.

[73] Assignee: Henkel Corporation, Ambler, Pa.

[21] Appl. No.: 825,390

[22] Filed: Feb. 3, 1986

[51] Int. Cl.$^4$ .................. B01F 5/10; C11D 13/00; C11D 15/02; G06F 15/46

[52] U.S. Cl. .................. 252/370; 252/108; 252/369; 260/417; 260/418; 260/693; 260/698; 364/500; 364/502; 366/136

[58] Field of Search ........... 252/108, 367, 368, 369, 252/370; 260/417, 418, 693, 698; 366/136; 364/500, 502

[56] References Cited

U.S. PATENT DOCUMENTS

| | | | |
|---|---|---|---|
| 2,578,366 | 12/1951 | Mills | 252/134 |
| 2,823,187 | 2/1958 | Coyle | 252/114 |
| 3,116,912 | 1/1964 | Finsberg | 252/71 |
| 3,830,473 | 8/1974 | Lieferman | 366/136 |
| 3,909,596 | 9/1975 | Sullivan | 364/510 |
| 3,959,636 | 5/1976 | Johnson | 364/502 |
| 4,018,565 | 4/1977 | Fletcher | 364/500 |
| 4,053,743 | 10/1977 | Niemi | 364/500 |
| 4,073,664 | 2/1978 | Zwirlein | 134/18 |
| 4,149,981 | 4/1979 | Bodrov et al. | 252/35 |
| 4,272,824 | 6/1981 | Lewinger | 364/502 |
| 4,299,501 | 11/1981 | Patil | 366/136 |
| 4,449,828 | 5/1984 | Mansour | 366/147 |
| 4,496,244 | 1/1985 | Ludwig | 366/136 |
| 4,559,202 | 12/1985 | Luetzelschwab | 422/134 |
| 4,576,978 | 3/1986 | Luetzelschwab | 523/313 |
| 4,589,924 | 5/1986 | De Erckel et al. | 127/37 |

FOREIGN PATENT DOCUMENTS 605653 7/1948 United Kingdom .

*Primary Examiner*—Dennis L. Albrecht
*Attorney, Agent, or Firm*—Willie Krawitz

[57] ABSTRACT

A reactor vessel is provided for saponification processes having reaction times of about 2–5 minutes. The reactants are fed sequentially through a load cell, for weighing, and feeding into a reactor containing water. The reactants are sequentially mixed and reacted by recycling, and at the end of the reaction time, the recycling is terminated and the finished product is pumped to storage. A microprocessor controller may be provided to sequence the feed and amount of reactants and the reaction times. The reactor also may be used to function as a mixer for batch reactions on a semi-continuous basis.

8 Claims, 3 Drawing Figures

PROCESS AND APPARATUS FOR SAPONIFICATION REACTIONS, AND THE LIKE

BACKGROUND OF THE INVENTION

This invention relates to a new and improved process and apparatus for saponification reactions to produce liquid soaps on a batch scale over a sufficiently short time interval to effect a semicontinuous process. Typically, the reaction times are in the order of about 2-5 minutes, and reactor vessel capacities of about 1-25 gallons, or greater.

The chemical industry manufactures a wide variety of liquid soaps at plant sites in large quantities for shipping in container cars, drums, etc. The containers are then returned to the site and refilled. In the case of drums, they are usually washed prior to return, which creates a waste disposal problem. In addition, when shipping from a chemical manufacturing plant, the weight of water diluent in the liquid soap represents a transportation expense. Today, the manufacture of liquid soaps used in industry no longer poses a manufacturing problem from the chemical standpoint. The greater problem is posed in transportation of chemically toxic wastes, and in use of reactors which are economically effective in both large and small scale manufacture of the product.

Obviously, it would be far less expensive to ship raw materials to the site of use and manufacture the liquid soap at that particular site. This would enable the raw materials to be shipped in bulk, without water, and then be pumped out of, say, tanker cars, or large containers directly into a saponification reactor vessel.

Heretofore, the capital costs of large reactor vessels for saponification reactions in batch form were not economic in small sizes. However, if a batch chemical operation could be carried out in a reasonably continuous manner, or in a semi-continuous manner, the equipment capital costs could be reduced sufficiently to enable a user to manufacture liquid soaps on site. It would be also useful if the same reactor used for a chemical reaction could be used in the manufacture of similar ingredients formed simply by mixing, such as cleaning compounds, beverages, foods, etc. Thus, saponification reactions, esterification reactions, the manufacture of detergents, lubricant soaps, etc., are included in the term saponification reactions, and the like.

THE INVENTION

According to the invention, a process and apparatus is provided for the batch manufacture on a semi-continuous basis for saponification reactions, and the like. Basically, the reactions produce liquid products during a reaction time which varies from about 2-5 minutes. The ingredients are added sequentially in weighed amounts to water in the reactor, and the mixture of water and ingredients are recycled, usually continuously, to ensure adequate mixing during a predetermined reaction time set for each ingredient.

At the expiry of the total ingredient reaction time, the recycling operation is stopped and the liquid reactant product is fed to storage; the process is then repeated. Since the process is carried out a large number of times daily, it is preferred to employ a microprocessor to control valve on-off times to enable sequencing of reactant addition and reaction times. This reduces the possibility of operator errors and also ensures product uniformity. Various techniques may be ued to obtain an accurate feed of reactants and include the use of a load cell, pump rates (rpm), timed volume feed, etc.

Typical raw material for saponification reactions include: tall oil, coconut oil, oleic acid, linoleic acid, saponifyable oils containing liquid oleic and linoleic acid, and cracked oils. Other base chemicals include fatty acids such as butyric, caproic, caprylic, undecanoic, capric, nonanoic, lauric, myristic, palmitic, stearic, elaidic, and mixtures thereof. Alkalis suitable for the saponification reaction include NaOH, KOH, and the mono, di, and triethanolamines.

Reaction temperatures usually vary from about 120° F.-140° F., however, the maximum temperature limits are considered to vary from about 70° F.-200° F. These temperatures are achieved partly by the use of hot water and partly by the exothermic temperature reaction.

The usual concentrations of ingredients are about 5:1-6:1 of saponifyable raw material/caustic, where the saponification number varies from about 175-280. The amount of water used is at least 60% of the total weight of ingredients, and typically 75%-80% by weight of the ingredient concentration. Saponifyable oils, e.g. tall oil may employed as a 100% concentrated liquid, and the caustic is added as a 45%-50% solution.

Additives such as chelates, EDTA and detergents may be used to reduce the effect of hard water ions. Solvents such as isopropyl alcohol, glycol ether and butyl acetate are useful as solvents and viscosity thinners. Antimicrobial agents, bacteriostats, preservatives, essences, perfumes, etc., also may be used.

Reactor vessel sizes of about 1-25 gallons are suitable for most reactors, and the only practical upper limit on reactor size is that imposed by the economics of a large size plant. It will be appreciated that small size reactors of say 1-2 gallons are suitable for use in such diverse areas as dairies, laundries, restaurants, hotels, where the raw material economics and process costs are counterbalanced by the cost of delivered liquid soap.

DESCRIPTION OF THE PREFERRED EMBODIMENTS

Figure 1:
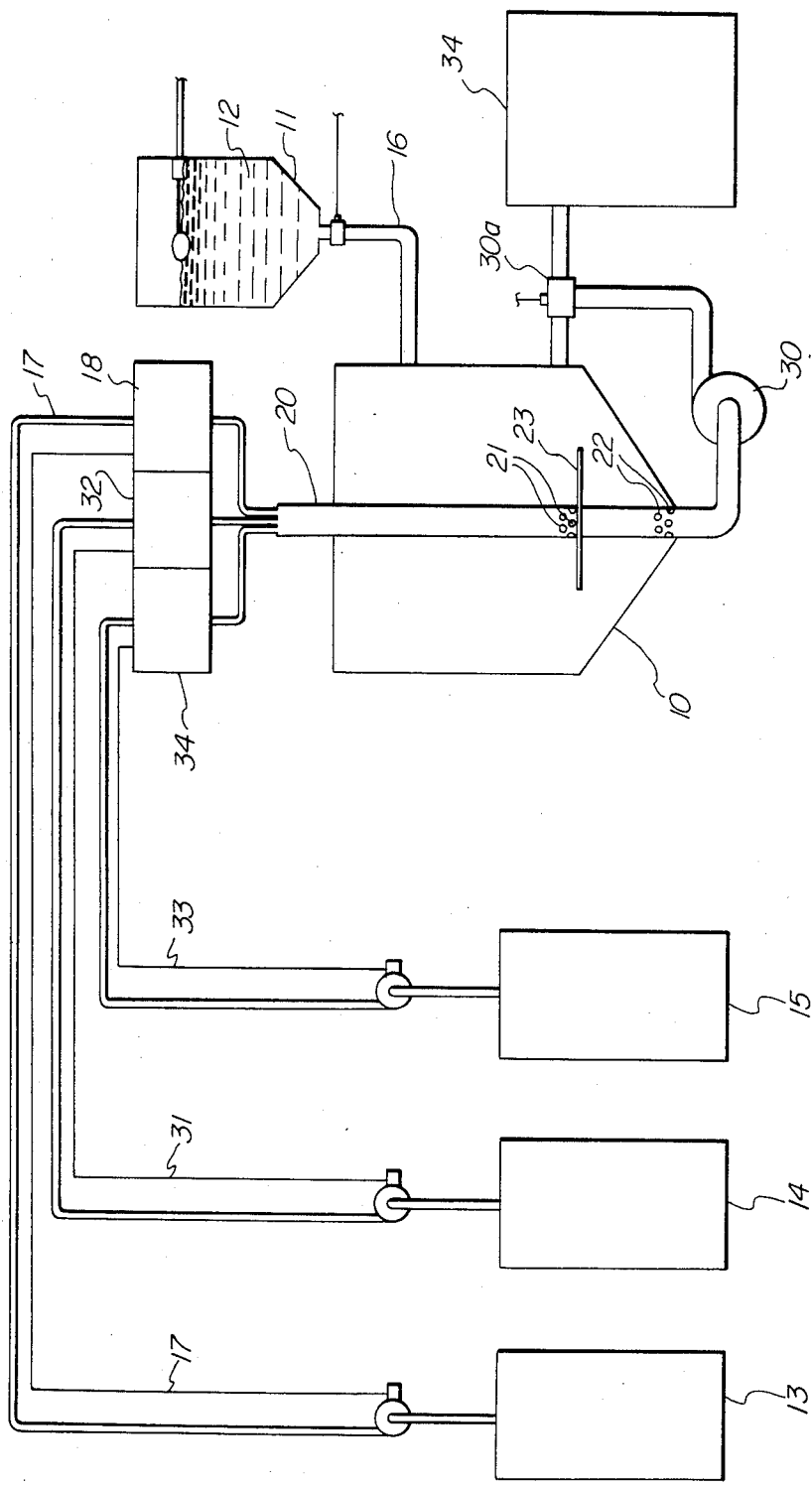
FIG. 1 is a schematic and block diagram view of the apparatus suitable in the invention.

One form of apparatus of this invention is shown in FIG. 1, and comprises a cone shaped reactor vessel 10 fed from a supply tank 11 containing water 12 and reactor tanks 13, 14 and 15. Prior to commencement of the reaction, water is gravity fed and weighed into the reactor through a line 16, followed in sequence by the other reactants. Tall oil, and the like from tank 13 is then fed through line 17 by pump 18, weighed by a load cell 19, to produce a weighed, stoichiometric amount of reactant, and then fed through an inlet feed pipe 20 into the reactor vessel 10. The feed pipe 20 has two sets of perforations 21, 22 and a baffle plate 23 to direct the flow of water and reactants toward the sidewall of the vessel for improved circulation and mixing.

A recirculating pump 30 recirculates the mixture of water and tall oil from the bottom of the tank and through a recirculation valve 30a to an intermediate level of the tank, usually just (e.g. 2 inches) below the liquid level, until adequate mixing has occurred. After a predetermined set period of mixing, caustic such as KOH is fed from tank 14 through line 31 by pump 32, where it is weighed by the load cell and pumped into the reactor 10. Mixing by means of the recirculating pump 30 is continued. Finally, EDTA, chelates, detergents, solvents, thinners, etc., in tank 15 (or additional tanks, if necessary) are pumped through line 33 by pump 34 into the load cell and then to the reactor vessel 10. Mixing and reacting by means of recirculation pump 30 is preferably continuous.

After a preset fixed period of reaction time, the recirculation valve 30a is switched from the reactor vessel 10 to a storage tank 33 through line 34. The liquid soap which has been formed in the reactor vessel is then pumped out of the reactor by pump 30 through line 34 and into the storage tank 33, containers, etc., for use. Obviously, if desired, the heat of reaction which has been transferred from the reactor to the storage tank can be removed for use in the building.

Figure 2:
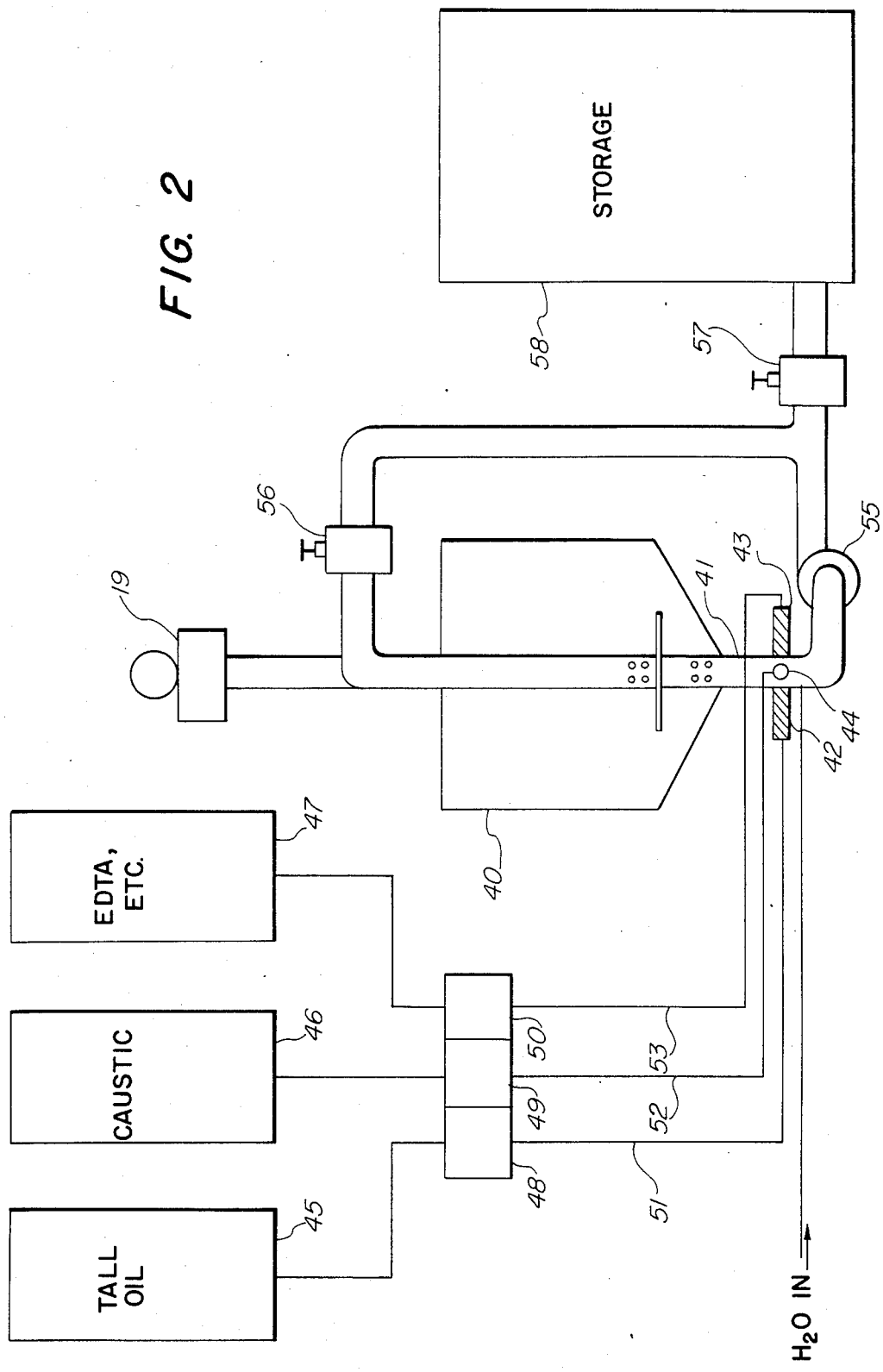
FIG. 2 is a schematic view of another embodiment of the invention suitable for feeding reactants to the reactor; and, FIG. 3 is a schematic of the flow control process of the invention.

In another embodiment of this invention, as shown in FIG. 2, all the ingredients are fed through separate inlets leading to a common inlet feed pipe which is centrally located in the reactor vessel, as in FIG. 1. This common inlet feed provides a more intimate mixing, and hence a more efficient reaction of the ingredients.

The reactor vessel 40 is shown being fed from an inlet feed pipe 41 having lower entry ports 42, 43 44 which lead from supply tanks 45, 46 and 47. Pumps 48, 49 and 50 sequentially pump the reactants from their respective supply tanks through lines 51, 52 and 53 to the lower entry ports 42, 43 and 44. Water is separately fed from a supply source (e.g. a water line) to the inlet feed pipe 41 through an entry port (not shown). The water of course acts as a diluent and to control the exothermic temperature rise of the reaction.

A recycle pump 55 recirculates and mixes ingredients from the supply tanks 45, 46 and 47 through a recirculation valve 56 and the load cell 19 into the reactor vessel 40 through the top, as opposed to the side entry shown in FIG. 1. At the end of the reaction period, valve 56 is shut and a transfer valve 57 is opened. This enables the liquid soap which has been produced to be diverted into the storage tank 58.

Figure 3:
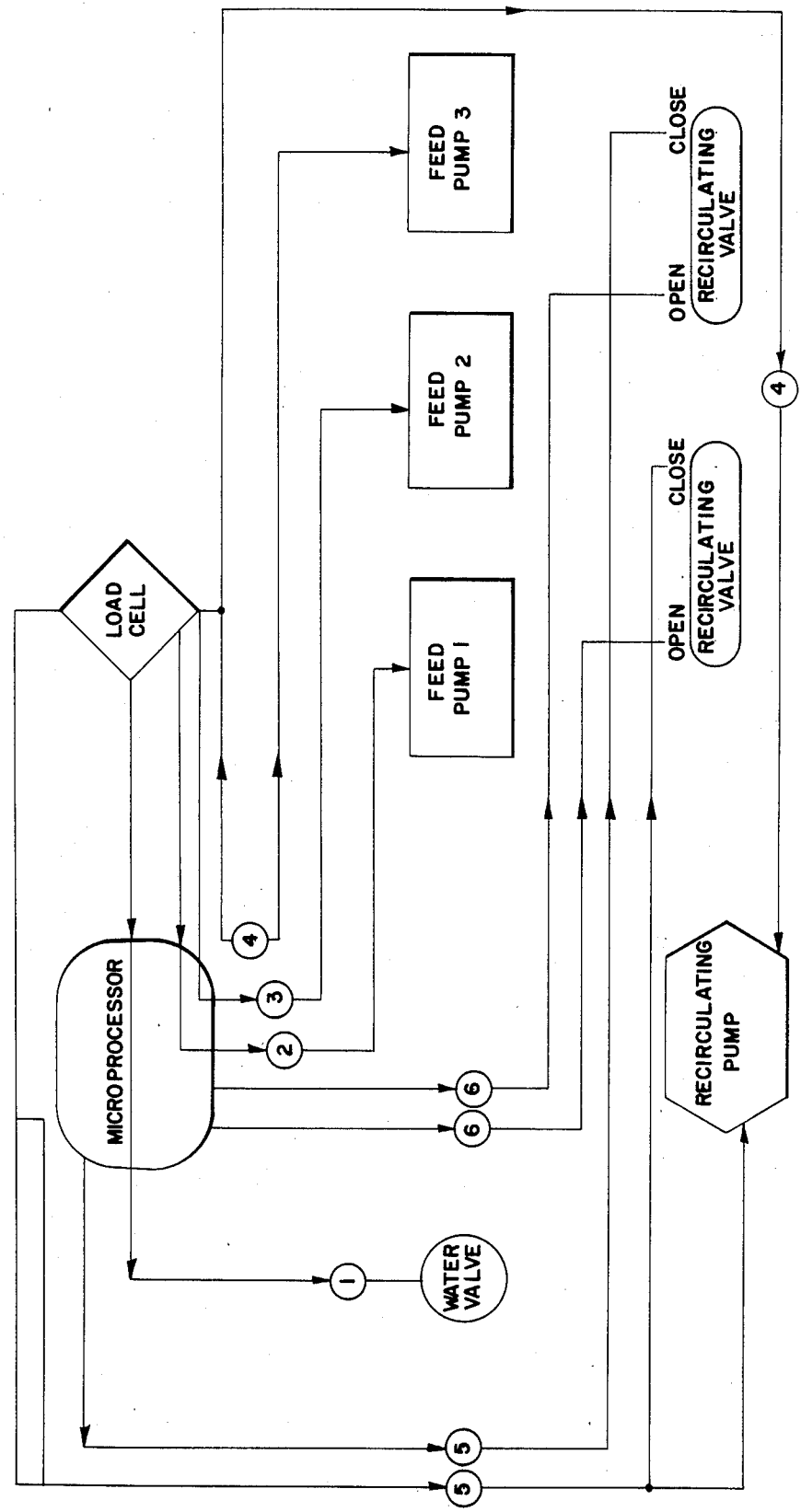

FIG. 3 shows a process flow chart for the sequencing of the ingredient flow, the numerals showing the specific sequencing steps. In step 1, water flow is commenced by the microprocessor which checks the set weight through the load cell. When the set weight equals actual weight, the water valve is closed.

In step 2, ingredient 1 is fed into the reactor by the microprocessor which starts feed pump 1. Again the set weight of the ingredient is compared by the microprocessor with the actual reading from the load cell. When the two weights are equal, feed pump 1 is turned off by the microprocessor.

In steps 3 and 4, the remaining two ingredients are added, with the same weight checking being made, as in steps 1 and 2. In step 4, the recirculation pump is started by the microprocessor prior to the commencement of the weighing check by the microprocessor. Afer a set period of recirculation (i.e., mixing), during which time the ingredients have reacted, the recirculation pump is stopped.

Step 5 involves a transfer cycle, and here the recirculation valve 56 is closed, the transfer valve 57 is opened, and the recirculation pump is started and runs until the load cell reads zero weight by comparison with the total input weight of all ingredients. The recirculation pump is then stopped.

In step 6, the recycle valve is opened and the transfer valve is closed to complete an entire single operation, which as indicated occurs during a 2-5 minute interval. The system then recycles to step 1.

Obviously, many variations are possible for the process control. For example, the recirculation pump could be run continuously (at low speed) when mixing is not required to avoid frequent starts and stops and to reduce start up power requirements.

I claim:

1. A process for saponification reactions, and the like in liquid form, comprising the steps of:
   (a) sequentially feeding liquid saponifyable ingredients from separate ingredient supply means in stoichiometric amounts to a cone-bottomed reactor vessel providing a bottom outlet and a feed pipe inlet, the ingredients being fed to the reactor vessel at a rate determined by means including a load cell and timed volume feed means;
   (b) continuously recycling the ingredients through the reactor vessel in a recycling circuit consisting of a recycling pump connected to the bottom outlet of the reactor vessel and the feed pipe inlet, to effect mixing and reaction of the ingredients in the feed pipe and the reactor vessel below the surface of the ingredients, and produce soap in liquid form;
   (c) controlling an exothermic reaction temperature rise and diluting the ingredients by adding water;
   (d) diverting the recycling of the liquid soap from the reactor vessel to a storage vessel; and,
   (e) controlling feed rates, feed amounts, mixing and reaction times, and diverting times of the ingredients by microprocessor means;
   (f) the said process steps having a combined time of about 2-5 minutes, at a reaction temperature of about 70° F.-200° F.

2. The process of claim 1, in which the reactor vessel has a capacity of about 1-25 gallons.

3. The process of claim 1, in which the saponifyable feed stock defines a saponification number from about 175-280.

4. The process of claim 1, in which the amount of water contained in the ingredients varies from about 60%-80%, by weight of the total weight of ingredients.

5. The process of claim 4, in which the concentrations of ingredients are about 5:1-6:1 of saponifyable raw material/caustic, where the saponification number varies from about 175-280.

6. The process of claim 5, in which the saponifyable material is employed as a 100% concentrated liquid, and the caustic is added as a 45%-50% solution.

7. The process of claim 6, in which the raw material for saponification reactions include: tall oil, coconut oil, oleic acid, linoleic acid, saponifyable oils containing liquid oleic and linoleic acid, and cracked oils, fatty acids, butyric acid, caproic acid, caprylic acid, nonanoic acid, lauric acid, myristic acid, palmitic acid, stearic acid, elaidic acid, and mixtures thereof.

8. The process of claim 7, in which alkalis employed in the saponification reaction include: NaOH, KOH, and the mono, di, and triethanolamines.

* * * * *